(12) United States Patent
Lefebvre et al.

(10) Patent No.: US 9,878,229 B2
(45) Date of Patent: *Jan. 30, 2018

(54) SKATE WITH INJECTED BOOT FORM

(71) Applicant: BAUER HOCKEY, INC., Exeter, NH (US)

(72) Inventors: Marc Andre Lefebvre, Taichung (TW); Aky Hung, Taichung (TW); Dmitry Rusakov, Van Nuys, CA (US)

(73) Assignee: BAUER HOCKEY, LLC, Exeter, NH (US)

( * ) Notice: Subject to any disclaimer, the term of this patent is extended or adjusted under 35 U.S.C. 154(b) by 672 days.

This patent is subject to a terminal disclaimer.

(21) Appl. No.: 14/094,599

(22) Filed: Dec. 2, 2013

(65) Prior Publication Data

US 2014/0252736 A1    Sep. 11, 2014

Related U.S. Application Data

(63) Continuation-in-part of application No. 13/794,071, filed on Mar. 11, 2013, now Pat. No. 9,510,639.

(51) Int. Cl.
*A43B 5/16* (2006.01)
*A63C 1/00* (2006.01)
(Continued)

(52) U.S. Cl.
CPC .............. *A63C 1/00* (2013.01); *A43B 5/0496* (2013.01); *A43B 5/1625* (2013.01);
(Continued)

(58) Field of Classification Search
CPC ... A43B 5/1616; A43B 5/1625; A43B 5/1691; B29D 35/02; B29D 35/04
(Continued)

(56) References Cited

U.S. PATENT DOCUMENTS 41,694 A    2/1864   Getty
61,998 A    2/1867   Bushman
(Continued)

FOREIGN PATENT DOCUMENTS

CA    1190571    7/1985
CA    2292995    6/2000
(Continued)

OTHER PUBLICATIONS

Reinhardt, Five Popular Women's Ice Hockey Skates, Yahoo Contributor Network, Dec. 9, 2009. Retrieved from the internet: <http://voices.yahoo.com/five-popular-womens-ice-skates-2039606.html>.

(Continued)

*Primary Examiner* — Ted Kavanaugh

(57) ABSTRACT

A boot form for a hockey skate is made of multiple plastic materials having different hardness properties, or different flexural moduli, and is formed via an injection-molding process or another similar process. One or more of the plastic materials may be reinforced with fibers of glass, carbon, aramid, or another stiffening material to strengthen one or more regions of the boot form. For example, pellets of a first plastic material having a flexural modulus of approximately 190 MPa (e.g., a polyamide elastomer block amide) may be injected into a mold to form a softer upper region of the boot form. And pellets of a second plastic having a flexural modulus of approximately 20,000 MPa (e.g., a Nylon 12 with long glass fibers) may be injected into the mold to form a stiffer lower region of the boot form. Additional skate components may then be attached to the boot form.

19 Claims, 3 Drawing Sheets

(51) Int. Cl.
　　　*A63C 1/42* (2006.01)
　　　*B29D 35/04* (2010.01)
　　　*A43B 23/02* (2006.01)
　　　*B29D 35/00* (2010.01)
　　　*A43B 5/04* (2006.01)

(52) U.S. Cl.
　　　CPC .......... *A43B 5/1666* (2013.01); *A43B 5/1691* (2013.01); *A43B 23/025* (2013.01); *A63C 1/42* (2013.01); *B29D 35/0009* (2013.01); *B29D 35/0054* (2013.01); *B29D 35/04* (2013.01)

(58) Field of Classification Search
　　　USPC .................. 36/54, 115, 10, 117.6, 117.8
　　　See application file for complete search history.

(56) References Cited

U.S. PATENT DOCUMENTS

| | | | |
|---|---|---|---|
| 275,482 A | 4/1883 | Gregg | |
| 439,161 A | 10/1890 | Krause | |
| 703,828 A | 7/1902 | Read | |
| 1,598,504 A | 8/1926 | Pierce et al. | |
| 2,211,822 A | 8/1940 | Jennings | |
| 2,230,553 A | 2/1941 | Weisman | |
| 2,563,763 A | 8/1951 | Vietas | |
| 2,617,207 A | 11/1952 | Jennett | |
| 2,789,374 A | 4/1957 | Planert | |
| 2,918,734 A | 12/1959 | Hyde | |
| 3,235,978 A | 2/1966 | Hyde | |
| 3,243,191 A | 3/1966 | Weisman | |
| 3,729,841 A | 5/1973 | Wagner | |
| 4,072,317 A | 2/1978 | Pommerening | |
| 4,107,856 A | 8/1978 | Bourque | |
| 4,222,184 A | 9/1980 | Kastinger | |
| 2,473,280 A | 7/1981 | Decamp et al. | |
| 4,280,286 A | 7/1981 | Santor | |
| 4,384,413 A | 5/1983 | Bourque | |
| 4,453,727 A | 6/1984 | Bourque | |
| 4,509,276 A | 4/1985 | Bourque | |
| 4,561,196 A | 12/1985 | Petrini et al. | |
| 4,615,127 A | 10/1986 | Delery | |
| 4,655,465 A | 4/1987 | Schaeffer | |
| 4,773,658 A | 9/1988 | Bourque et al. | |
| 4,835,885 A | 6/1989 | Hoshizaki et al. | |
| 4,865,023 A | 9/1989 | Craythorne et al. | |
| 4,869,001 A | 9/1989 | Brown | |
| 4,901,455 A | 2/1990 | Morell et al. | |
| 4,964,229 A | 10/1990 | Laberge | |
| 5,016,623 A | 5/1991 | Krahenbuhl | |
| 5,050,138 A | 9/1991 | Borden | |
| 5,050,620 A | 9/1991 | Cooper | |
| 5,072,529 A | 12/1991 | Graf | |
| 5,090,138 A | 2/1992 | Borden | |
| D324,447 S | 3/1992 | Purdom | |
| 5,171,033 A | 12/1992 | Olson et al. | |
| 5,255,929 A | 10/1993 | Lemelson | |
| 5,272,823 A | 12/1993 | Perrissoud | |
| 5,295,316 A | 3/1994 | Bergamin | |
| 5,329,705 A | 7/1994 | Grim et al. | |
| 5,400,529 A | 3/1995 | Bell et al. | |
| 5,406,721 A | 4/1995 | Marcolin | |
| 5,408,763 A | 4/1995 | Sartor et al. | |
| 5,437,466 A | 8/1995 | Meibock et al. | |
| 5,452,907 A | 9/1995 | Meibock et al. | |
| 5,491,911 A | 2/1996 | Chen | |
| 5,498,033 A | 3/1996 | Hoshizaki et al. | |
| 5,505,467 A | 4/1996 | Hill et al. | |
| 5,575,091 A | 11/1996 | Mattiuzzo | |
| 5,662,338 A | 9/1997 | Steinhauser, Jr. | |
| 5,694,703 A | 12/1997 | Diaz | |
| 5,769,434 A | 6/1998 | Wurthner | |
| 5,778,565 A | 7/1998 | Holt et al. | |
| 5,779,246 A | 7/1998 | Bengtsson | |
| 5,794,362 A | 8/1998 | Polk et al. | |
| 5,799,955 A | 9/1998 | Iverson | |
| 5,819,440 A | 10/1998 | Okajima | |
| 5,822,887 A | 10/1998 | Turner | |
| 2,766,065 A | 1/1999 | Salomon | |
| 5,875,566 A | 3/1999 | Bourdeau et al. | |
| 5,887,361 A | 3/1999 | Cabanis et al. | |
| 5,926,978 A | 7/1999 | Smith | |
| 5,926,979 A | 7/1999 | Borel | |
| 2,774,563 A | 8/1999 | Salomon | |
| 5,933,986 A | 8/1999 | Donnadieu | |
| 5,937,546 A | 8/1999 | Messmer | |
| 5,966,843 A | 10/1999 | Sand et al. | |
| 5,967,531 A | 10/1999 | Saillet | |
| 5,971,405 A | 10/1999 | Edauw | |
| 6,018,892 A | 2/2000 | Acheson et al. | |
| 6,047,975 A | 4/2000 | Benoit et al. | |
| 6,070,886 A | 6/2000 | Cornelius et al. | |
| 6,070,887 A | 6/2000 | Cornelius et al. | |
| 6,076,285 A | 6/2000 | Caeran et al. | |
| 6,079,128 A | 6/2000 | Hoshizaki et al. | |
| 6,102,881 A | 8/2000 | Quackenbush et al. | |
| 6,105,280 A * | 8/2000 | Marcolin | A43B 3/0047 36/115 |
| 6,109,622 A | 8/2000 | Reynolds | |
| 6,112,434 A | 9/2000 | Seltzer et al. | |
| 6,120,038 A | 9/2000 | Dong et al. | |
| 6,138,384 A | 10/2000 | Messmer | |
| 6,139,030 A | 10/2000 | Meibock et al. | |
| 6,152,459 A | 11/2000 | Meibock et al. | |
| 6,168,172 B1 | 1/2001 | Meibock et al. | |
| 6,217,036 B1 | 4/2001 | Rowledge | |
| 6,223,457 B1 | 5/2001 | Graf | |
| 6,254,110 B1 | 7/2001 | Meibock et al. | |
| 6,260,290 B1 | 7/2001 | Chenevert | |
| 6,293,564 B1 | 9/2001 | Gabrielli | |
| 6,293,565 B1 | 9/2001 | Bouchard et al. | |
| 6,295,679 B1 * | 10/2001 | Chenevert | A43B 3/26 12/142 P |
| 6,321,466 B1 | 11/2001 | Bordin et al. | |
| D455,836 S | 4/2002 | Lammers | |
| 6,364,321 B1 | 4/2002 | Steinhauser, Jr. | |
| 6,367,818 B2 | 4/2002 | Meibock et al. | |
| 6,371,494 B1 | 4/2002 | Bonaventure et al. | |
| 6,381,877 B2 | 5/2002 | Filice | |
| 6,419,241 B1 | 7/2002 | Chenevert | |
| 6,519,877 B2 | 2/2003 | Oetting et al. | |
| 6,533,295 B2 | 3/2003 | Gonthier | |
| 6,550,159 B1 | 4/2003 | Madore | |
| 6,557,864 B1 | 5/2003 | Lenoir | |
| 6,601,042 B1 | 7/2003 | Lyden | |
| 6,725,577 B2 | 4/2004 | Mazzarolo | |
| 6,769,203 B1 | 8/2004 | Wright et al. | |
| 6,935,054 B2 | 8/2005 | Hall et al. | |
| 6,993,860 B2 | 2/2006 | Bettiol | |
| 7,039,977 B2 | 5/2006 | Wilder | |
| 7,082,703 B2 | 8/2006 | Greene et al. | |
| 7,140,127 B2 | 11/2006 | Yang | |
| 7,171,768 B2 | 2/2007 | Klein | |
| 7,219,450 B2 | 5/2007 | Langley | |
| 7,219,900 B2 | 5/2007 | Meibock | |
| 7,235,813 B2 | 6/2007 | Bock | |
| 7,290,355 B2 | 11/2007 | Labonte | |
| 7,290,773 B2 | 11/2007 | Eck et al. | |
| 7,325,813 B2 | 2/2008 | Bock | |
| RE40,363 E | 6/2008 | Grim et al. | |
| 7,380,354 B2 | 6/2008 | Yamashita et al. | |
| 7,387,302 B2 | 6/2008 | Goldsmith et al. | |
| 7,392,990 B2 | 7/2008 | Bussiere | |
| 7,398,609 B2 | 7/2008 | Labonte | |
| 7,451,991 B2 | 11/2008 | Labonte | |
| 7,533,479 B2 | 5/2009 | LaBonte | |
| 7,562,881 B2 | 7/2009 | Crowder | |
| 7,712,173 B2 | 5/2010 | Labonte | |
| 7,770,930 B2 | 8/2010 | McLeod | |
| 7,793,947 B2 | 9/2010 | LaBonte | |
| 7,806,418 B2 | 10/2010 | Labonte et al. | |
| 7,896,363 B2 | 3/2011 | Lovejoy | |
| 7,908,771 B2 | 3/2011 | Foxen et al. | |
| 7,950,676 B2 | 5/2011 | Goldsmith | |
| 8,109,536 B2 | 2/2012 | Labonte | |

(56) References Cited

U.S. PATENT DOCUMENTS

| | | | |
|---|---|---|---|
| 8,302,329 | B2 | 11/2012 | Hurd et al. |
| 8,353,535 | B2 | 1/2013 | Salmon et al. |
| 8,387,286 | B2 | 3/2013 | Koyess et al. |
| 8,479,416 | B2 | 7/2013 | Auger |
| 8,684,368 | B2 | 4/2014 | Van Horne |
| 8,745,898 | B2 | 6/2014 | Stewart |
| 9,510,639 | B2 * | 12/2016 | Cruikshank .......... A43B 5/1625 |
| 2001/0006282 | A1 | 7/2001 | Green et al. |
| 2001/0022434 | A1 | 9/2001 | Sauter et al. |
| 2001/0026054 | A1 | 10/2001 | Olson et al. |
| 2002/0108272 | A1 * | 8/2002 | Parisotto .............. A43B 1/0027 36/117.1 |
| 2003/0015848 | A1 | 1/2003 | Pham et al. |
| 2003/0097769 | A1 | 5/2003 | Gabrielli |
| 2003/0102641 | A1 | 6/2003 | Liu |
| 2003/0115775 | A1 | 6/2003 | Mazzarolo |
| 2003/0115777 | A1 | 6/2003 | Hall et al. |
| 2003/0193152 | A1 | 10/2003 | Meibock et al. |
| 2003/0196351 | A1 | 10/2003 | Hipp et al. |
| 2003/0204971 | A1 | 11/2003 | Fauver |
| 2004/0007836 | A1 | 1/2004 | Sauter et al. |
| 2004/0016150 | A1 | 1/2004 | Labonte et al. |
| 2004/0049950 | A1 | 3/2004 | Van Horne |
| 2004/0083625 | A1 | 5/2004 | Wilder |
| 2004/0090023 | A1 | 5/2004 | Crowder |
| 2004/0140631 | A1 | 7/2004 | Goldsmith et al. |
| 2004/0168357 | A1 | 9/2004 | Meibock |
| 2004/0194350 | A1 | 10/2004 | Mazzarolo |
| 2004/0200099 | A1 | 10/2004 | Chenevert |
| 2004/0207164 | A1 | 10/2004 | Meibock et al. |
| 2004/0226113 | A1 | 11/2004 | Wright et al. |
| 2004/0261298 | A1 | 12/2004 | Howard |
| 2005/0116379 | A1 | 6/2005 | Goldsmith et al. |
| 2005/0126046 | A1 | 6/2005 | Labonte et al. |
| 2005/0134010 | A1 | 6/2005 | Blankenburg et al. |
| 2005/0193594 | A1 | 9/2005 | Murphy |
| 2005/0204585 | A1 * | 9/2005 | Loveridge ............ A43B 1/0018 36/54 |
| 2005/0223604 | A1 | 10/2005 | Neuner |
| 2005/0229436 | A1 | 10/2005 | Bock |
| 2005/0267775 | A1 | 12/2005 | Willis |
| 2005/0273028 | A1 | 12/2005 | Reynolds et al. |
| 2005/0280222 | A1 | 12/2005 | Sauter et al. |
| 2006/0053661 | A1 | 3/2006 | Yang |
| 2006/0064904 | A1 | 3/2006 | Confortin et al. |
| 2006/0145434 | A1 | 7/2006 | Crowder |
| 2006/0179686 | A1 | 8/2006 | Labonte |
| 2006/0179687 | A1 | 8/2006 | Labonte |
| 2006/0181035 | A1 | 8/2006 | Labonte |
| 2006/0181076 | A1 | 8/2006 | Labonte |
| 2006/0201030 | A1 | 9/2006 | Wilder |
| 2007/0013152 | A1 | 1/2007 | Goldsmith et al. |
| 2007/0063457 | A1 | 3/2007 | Labonte et al. |
| 2007/0186448 | A1 | 8/2007 | Meibock |
| 2008/0018066 | A1 | 1/2008 | Pickford |
| 2008/0150242 | A1 | 6/2008 | Wurthner |
| 2008/0172906 | A1 | 7/2008 | Jou et al. |
| 2008/0238006 | A1 | 10/2008 | Labonte |
| 2009/0000151 | A1 | 1/2009 | Cavasin |
| 2009/0020967 | A1 | 1/2009 | Weber et al. |
| 2009/0188056 | A1 | 7/2009 | Labonte |
| 2009/0243238 | A1 | 10/2009 | Van Horne et al. |
| 2009/0289427 | A1 | 11/2009 | Lovejoy |
| 2010/0109312 | A1 | 5/2010 | Salmon et al. |
| 2010/0156058 | A1 * | 6/2010 | Koyess ................ A43B 5/1616 280/11.12 |
| 2010/0192412 | A1 | 8/2010 | Stewart |
| 2010/0275393 | A1 | 11/2010 | Jou et al. |
| 2011/0016617 | A1 | 1/2011 | Shrewsburg |
| 2011/0101665 | A1 | 5/2011 | Van Horne et al. |
| 2012/0025478 | A1 * | 2/2012 | Van Horne .......... A43B 5/1691 280/11.12 |
| 2012/0144703 | A1 * | 6/2012 | Trinkaus .............. A43B 5/0427 36/34 A |
| 2012/0204452 | A1 | 8/2012 | Van Horne et al. |
| 2013/0119580 | A1 * | 5/2013 | Yang ................ B29C 45/14475 264/279 |
| 2013/0214499 | A1 | 8/2013 | Koyess et al. |
| 2014/0097583 | A1 | 4/2014 | Vaughn |

FOREIGN PATENT DOCUMENTS

| | | |
|---|---|---|
| CA | 2497037 | 1/2012 |
| CA | 2750906 | 10/2012 |
| FR | 2473280 | 7/1981 |
| FR | 2766065 | 1/1999 |
| FR | 2774563 | 8/1999 |
| WO | WO2013137970 | 9/2013 |

OTHER PUBLICATIONS

United States Patent and Trademark Office, International Search Report and Written Opinion for PCT/US13/20763, dated May 21, 2013.

Canadian Intellectual Property Office, Office Action for CA 2801233, dated Apr. 22, 2013.

Canadian Intellectual Property Office, Office Action for CA 2801233, dated Aug. 12, 2013.

European Patent Office, Extended European Search Report for EP 14158831.9 dated Jul. 24, 2014 (7 pages).

European Patent Office, Extended European Search Report for EP 14158854.1dated Jul. 24, 2014 (9 pages).

Kor Hockey, Shift 2 model ice skates, NHL Digest product review dated Oct. 8, 2007.

Bauer Turbo Molded Hockey Skates, Aug. 2013.

Bauer Lil Champ Toddler Ice Skates, Aug. 2013.

CCM Champion 90 Ice Hockey Skates, Aug. 2013.

Final Office Action dated Mar. 21, 2016 in connection with U.S. Appl. No. 13/794,071, 19 pages.

* cited by examiner

SKATE WITH INJECTED BOOT FORM

CROSS-REFERENCE TO RELATED APPLICATION

This application is a continuation-in-part of U.S. patent application Ser. No. 13/794,071, filed on Mar. 11, 2013 and now pending, which is incorporated herein by reference.

BACKGROUND

The boot portions of hockey skates typically are constructed of substantially rigid materials. While these rigid constructions generally provide a wearer with suitable protection against impacts from pucks, sticks, and the like, the lack of flexibility in the skate boots—particularly in the upper regions of the skate boots—tends to restrict movement and limits the motions a skater can execute. Further, it is difficult to stitch or otherwise attach many materials to these rigid constructions, thus limiting the design options available to a skate designer.

SUMMARY

A boot form for a hockey skate is made of multiple plastic materials having different hardness properties, or different flexural moduli, and is formed via an injection-molding process or another similar process. One or more of the plastic materials may be reinforced with fibers of glass, carbon, aramid, or another stiffening material to strengthen one or more regions of the boot form. For example, pellets of a first plastic material having a flexural modulus of approximately 190 MPa (e.g., a polyamide elastomer block amide) may be injected into a mold to form a softer upper region of the boot form. And pellets of a second plastic having a flexural modulus of approximately 20,000 MPa (e.g., a Nylon 12 with long glass fibers) may be injected into the mold to form a stiffer lower region of the boot form. A skate quarter and other skate components may then be attached to the boot form.

To achieve a different performance characteristic, a first plastic having a flexural modulus of approximately 2100 MPa (e.g., a Nylon 12 with short glass fibers) may be injected into the mold to form a softer upper region of the boot form. And pellets of a second plastic having a flexural modulus of approximately 4200 MPa (e.g., a Nylon 12 with a higher content of short glass fibers) may be injected into the mold to form a stiffer lower region of the boot form. A skate quarter and other skate components may then be attached to the boot form.

Other features and advantages will appear hereinafter. The features described above can be used separately or together, or in various combinations of one or more of them.

BRIEF DESCRIPTION OF THE DRAWINGS

In the drawings, wherein the same reference number indicates the same element throughout the views.

DETAILED DESCRIPTION OF THE DRAWINGS

Various embodiments of the invention will now be described. The following description provides specific details for a thorough understanding and enabling description of these embodiments. One skilled in the art will understand, however, that the invention may be practiced without many of these details. Additionally, some well-known structures or functions may not be shown or described in detail so as to avoid unnecessarily obscuring the relevant description of the various embodiments.

The terminology used in the description presented below is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this detailed description section.

Where the context permits, singular or plural terms may also include the plural or singular term, respectively. Moreover, unless the word "or" is expressly limited to mean only a single item exclusive from the other items in a list of two or more items, then the use of "or" in such a list is to be interpreted as including (a) any single item in the list, (b) all of the items in the list, or (c) any combination of items in the list. Further, unless otherwise specified, terms such as "attached" or "connected" are intended to include integral connections, as well as connections between physically separate components.

Figure 1:
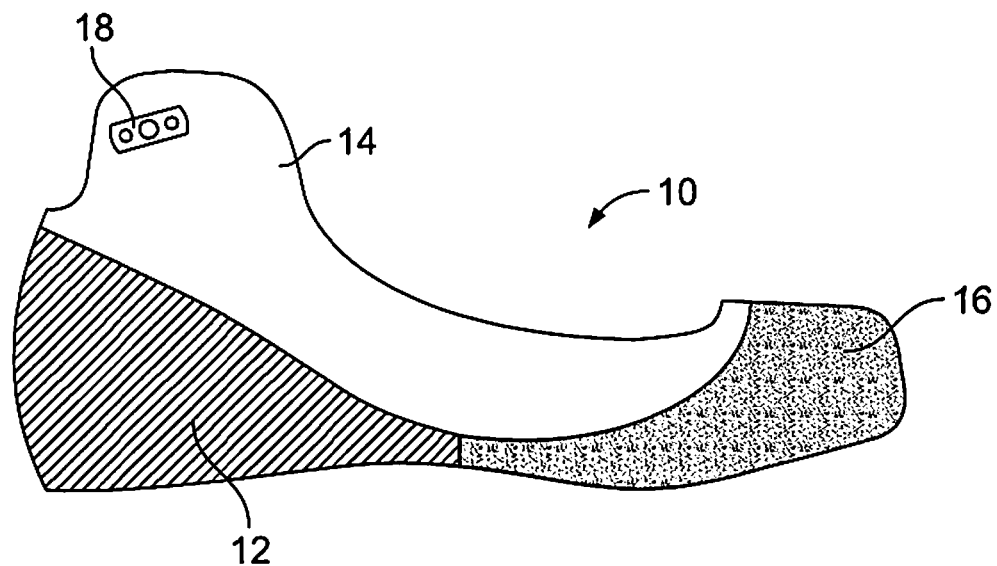
FIG. 1 is a perspective view of a boot form, according to one embodiment.
Figure 2:
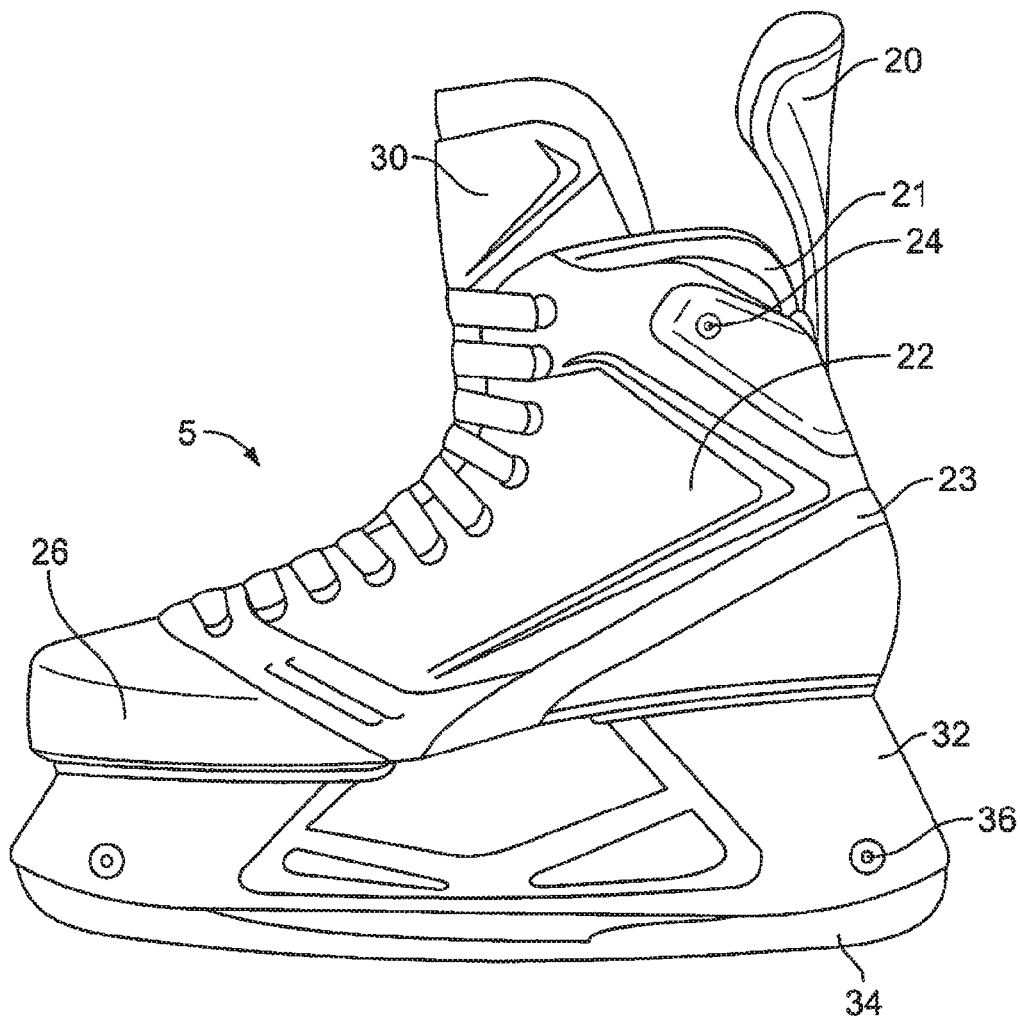
FIG. 2 is a perspective view of a hockey skate including the boot form shown in FIG. 1, according to one embodiment.

Turning now to FIGS. 1 and 2, a boot form 10 for a hockey skate 5 includes a rigid lower portion 12 and a less rigid upper portion 14. The upper portion 14 may be made of a thermoformable composite material, such as low density polyethylene, or of another material suitable for providing both structural support and relative flexibility in the upper portion 14. The lower portion 12 of the boot form 10 may be made of a rigid composite material, such as a carbon-fiber reinforced composite material, or of another suitable rigid material. The lower portion 12 of the boot form 10 may include an integral toe portion 16 made of the same material, or of a material having a similar rigidity, as the remainder of the lower portion 12. The various regions of the boot form 10 may be laid up and then cured together to form a unitary structure.

The boot form 10 may include multiple layers of material to yield an optimal flexibility for a given skate size. As the length and width of the skate 5 varies throughout the size ranges, the overall stiffness of the skate 5, if constructed in a uniform manner, also varies. A smaller-sized skate, for example, would have a greater stiffness than a similarly constructed larger-sized skate. Accordingly, the stiffness of the individual composite layers, particularly in the lower region 12 or the boot form 10, may be varied across different skate sizes to achieve a substantially equivalent skate stiffness or flexibility.

In one embodiment, the angles of the fibers in one or more layers of the boot form 10 may be adjusted based on the size of the skate 5. In skates having sizes 4 to 6.5, for example, the carbon or other fibers in the boot form 10 may be oriented to provide less relative stiffness than similarly situated fibers in skates having sizes 7-9.5, which may in turn have carbon or other fibers oriented to provide less relative stiffness than similarly situated fibers in skates having sizes 10 to 12.5. By varying the fiber angles in this manner, the overall flexion or torsional rigidity of the skate 5 can be substantially equalized throughout the available size ranges.

In one embodiment, the transition region between the upper portion 14 and the lower portion 12 of the boot form 10 is staggered during the layup process to provide a gradually changing flexibility along the length of the transition region. For example, the lower portion 12 of the boot form 10 may include one or more regions that extend upward beyond a neighboring region of the lower portion 12, or the lower portion 12 may include a stepped upper region providing a gradual increase or decrease in flexibility along the transition region. These arrangements may aid in the performance and durability of the skate 5.

Fastener elements 18 may be attached to or molded into the upper portion 14 of the boot form 10 to facilitate attachment of a tendon guard 20, a skate quarter 22, or other components. Screws 24, bolts, rivets, or other suitable fasteners may be used to engage the fastener elements 18 and to attach the components. In the illustrated embodiment, a portion of the skate quarter 22, as well as medial and lateral connecting portions of the tendon guard 20, are attached to the boot form 10 via screws 24 or similar connectors.

In one embodiment, two or more fastener elements 18 are included on each side of the boot form 10. As a result, the tendon guard 20 may be secured to multiple locations on each side of the boot form 10, thus preventing the tendon guard 20 from pivoting about the connection location. In another embodiment, stoppers 21 may additionally or alternatively be included at the upper regions of the skate boot to inhibit forward rotation of the tendon guard 20, as described, for example, in U.S. patent application Ser. No. 13/418,052, filed Mar. 12, 2012, which is incorporated herein by reference.

In one embodiment, a U-shaped notch or other opening is included in the rear of the skate boot to facilitate rearward extension of a wearer's ankle and lower leg during the skating motion. The tendon guard 20 may include a narrow mid-region to facilitate rearward flexing of the tendon guard 20, as described, for example, in U.S. patent application Ser. No. 13/271,029, filed Oct. 11, 2011, which is incorporated herein by reference.

The skate quarter 22 may be made of a thermoformable material, such as Surlyn®, high density polyethylene, or of another suitable material. Because the upper portion 14 of the boot form 10 is made of a thermoformable material or a similar material, the skate quarter 22 may be attached to the upper portion 14 of the boot form 10 via adhesives or stitching, as well as by the fasteners 18 described above. The use of a thermoformable upper portion 14 of the boot form 10, as well as a thermoformable skate quarter 22, facilitates conforming of the skate boot to the shape of a wearer's foot and ankle.

A molded protector 23 made of thermoplastic polyurethane, or of another suitable material, may be positioned over the lower edge of the skate quarter 22 to protect it from abrasion and from prying forces that could separate or delaminate the quarter 22 from the upper portion 14 of the boot form 10. Additionally, a molded toe cap 26 may be integral with or positioned over the integral toe portion 16 of the boot form 10. The toe cap 26 may be made of a plastic material, such as thermoplastic polyurethane, or of any other material suitable for providing protection to the toe region of the skate 5.

Figure 3:
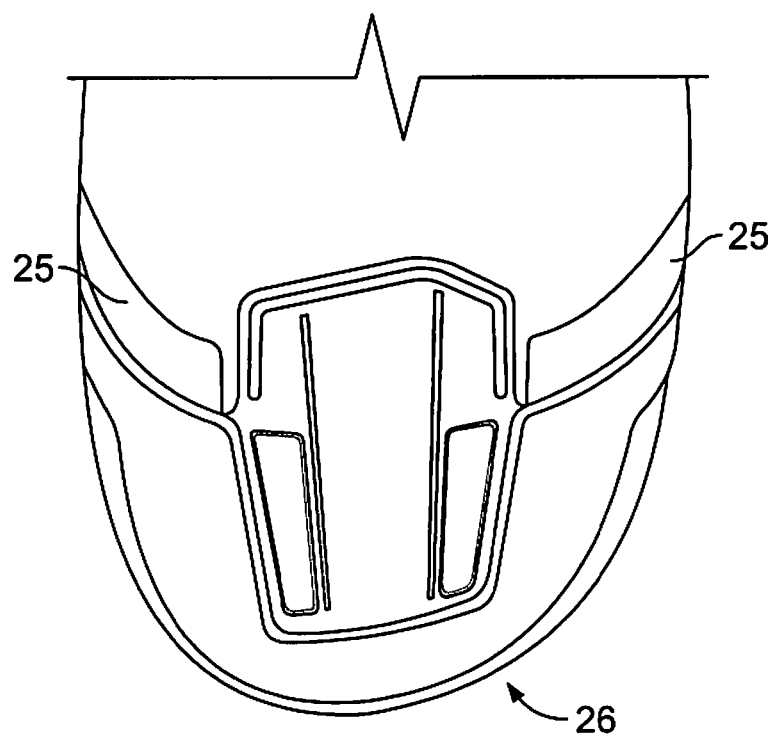
FIG. 3 is a perspective view of the toe cap of a skate boot, according to one embodiment.

As shown in FIG. 3, the toe cap 26 may include one or more flanges 25 or similar elements to which the skate quarter 22, the molded protector 23, or a skate tongue 30 may be attached. Connection of these components to the toe cap 26 may be advantageous, as it would be difficult to attach them directly to the rigid lower portion 12 of the boot form 10.

In one embodiment, the skate tongue 30 extends inside the toe region 16 of the boot form 10 to fill the space between the top of a wearer's foot and the upper, inner surface of the toe region 16. This arrangement provides comfort for the user, while also providing sensation and feedback during skating motions. In another embodiment, a separate filler element is positioned inside the toe region 16 adjacent to the end of the tongue 30 to provide similar benefits.

A blade holder 32 is attached to the lower portion 12 of the boot form 10 via screws, bolts, rivets, or other suitable connectors. The blade holder 32 may be made of DuPont Zytel® ST801 or of another suitable material. A blade 34 made of steel or of another suitable material is secured to the blade holder 32 via screws 36, rivets, bolts, or other suitable connectors. In one embodiment, the bottom of the boot form 10 includes a plurality of premolded openings to which the blade holder 32 is attached.

Multiple layers of material may be included on the interior region of the lower portion 12 of the boot form 10 to facilitate increased grip or holding strength of the screws or other connectors used to secure the blade holder 32 to the lower portion 12 of the boot form 10. Because the lower portion 12 of the boot form 10 is rigid, it does not readily accept connectors. Providing additional layers of material, however, increases the holding strength of the connectors. Additionally, the toe cap 26 preferably does not wrap underneath the toe region 16 so that it does not interfere with the attachment of the lower portion 12 of the boot form 10 to the blade holder 32.

The skate boot 5 described herein may be constructed by arranging in a mold the composite layers that make up the lower portion 12, upper portion 14, and toe region 16 of the boot form 10. As described above, the fiber angles in the given layers may be selected to provide the stiffness properties desired for a given skate size. Also as described above, the layers of the lower and upper portions 12, 14 of the boot form 10 optionally may be staggered to provide a graduated transition region between them.

Once the layers are arranged in the mold they are be cured under heat and pressure to create the boot form 10. The thermoformable upper portion 14 of the boot form 10 softens at a temperature range that does not affect the rigidity of the rigid lower portion 12 of the boot form 10. The upper portion 14, therefore, is able to conform to the shape of a wearer's foot and, after cooling, remain in that shape so that the skate 5 remains conformed to a wearer's foot. The skate quarter 22, toe cap 26, tongue 30, tendon guard 20, blade holder 32, and other skate components may then be attached to the boot form 10, or to each other, as described above.

Figure 4:
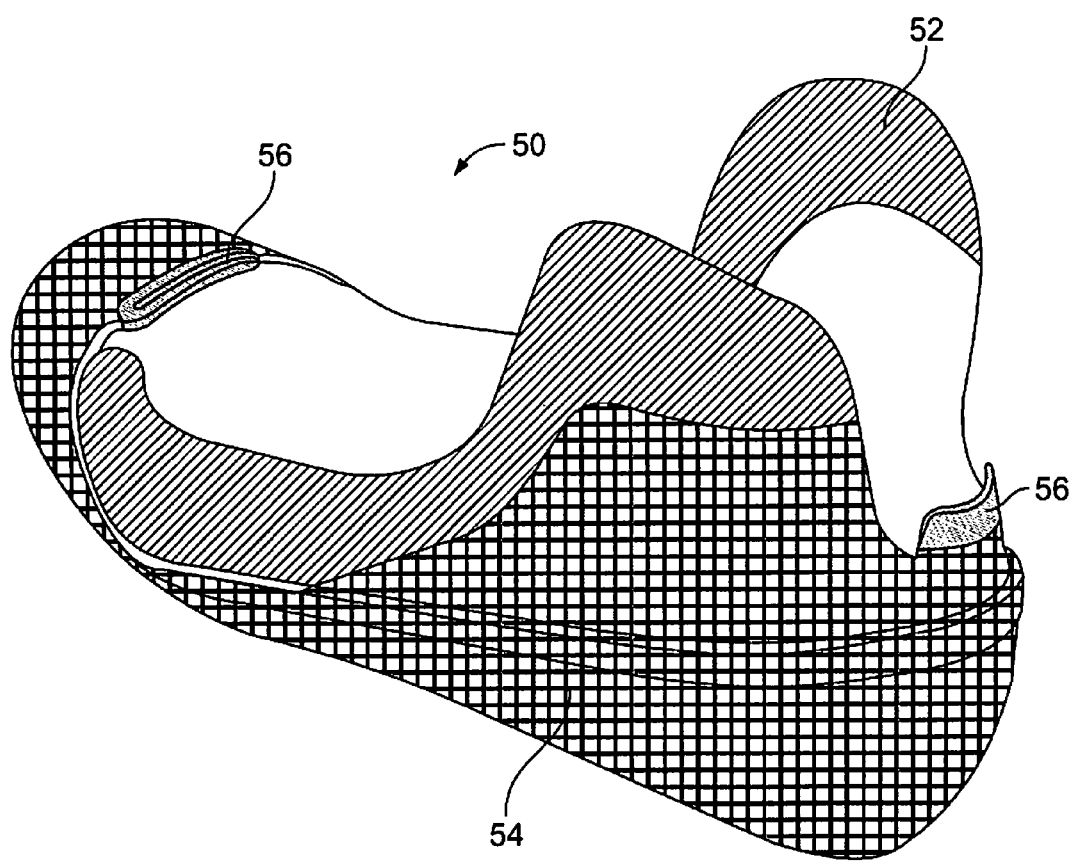
FIG. 4 is a perspective view of a boot form, according to another embodiment.

As illustrated in FIG. 4, in another embodiment, a boot form 50 may be made of multiple plastic materials having different hardness properties, or different flexural moduli, and may be formed via an injection-molding process or another similar process. One or more of the plastic materials may be reinforced with fibers of glass, carbon, aramid, or another stiffening material to strengthen one or more regions of the boot form 50. For example, pellets of a first plastic material having a flexural modulus of approximately 190 MPa (e.g., a polyamide elastomer block amide) may be injected into a mold to form the softer upper region 52 of the boot form. And pellets of a second plastic having a flexural modulus of approximately 20,000 MPa (e.g., a Nylon 12 with long glass fibers) may be injected into the mold to form the stiffer lower region 54 of the boot form.

To achieve a different performance characteristic, a first plastic having a flexural modulus of approximately 2100 MPa (e.g., a Nylon 12 with short glass fibers) may be injected into the mold to form a softer upper region of the boot form. And pellets of a second plastic having a flexural modulus of approximately 4200 MPa (e.g., a Nylon 12 with a higher content of short glass fibers) may be injected into the mold to form a stiffer lower region of the boot form. A skate quarter and other skate components may then be attached to the boot form.

The second plastic material preferably bonds with the first plastic material during heating and curing in the mold but could otherwise be attached in another suitable manner. If desired, a smaller amount of the stiffer, second plastic material may be introduced into the upper region 52 of the boot form 50 to increase the stiffness of the upper region 52 relative to a boot form including only the first plastic material in the upper region.

The use of different plastics having different flexural moduli facilitates customization of the boot form 50 to meet the preferences of a variety of users. For example, some users may prefer a very flexible upper region 52, while others may prefer an upper region 52 that, while more flexible than the lower region 54, is relatively close in stiffness to the lower region 54. In one embodiment, the upper region 52 of the boot form 50 is formed from a plastic material that is soft enough to receive stitches, such that a skate quarter or other elements of the skate may be stitched to the upper region 52.

In one embodiment, one or more flexible flanges or tabs 56 may be molded to, or otherwise attached to, one or more regions of the boot form 50. Components of a hockey skate may be attached to the tabs 56 via stitching, adhesive, or another suitable connector. For example, a flexible tab 56 may be molded or otherwise connected to the toe region of the boot form 50 for connection to a tongue of the skate. A flexible tab 56 may additionally or alternatively be molded or otherwise connected to the rear of the boot form for attachment to an inner liner of the skate boot or attachment to a tendon guard. Attaching a tendon guard to the flexible tab 56, for example, allows the tendon guard to flex rearward and forward via movement of the tab 56. Accordingly, the tendon guard may be made of a relatively stiff material to enhance protection, while still allowing the user to maximize range of leg motion in the rearward and forward directions due to the flexibility of the tab 56.

Once the boot form 50 is formed, a skate quarter, toe cap, tongue, tendon guard, blade holder, or other skate components may be attached to the boot form 50, or to each other, as described in the above embodiments. In one embodiment, a fabric layer or a composite-fiber layer may be positioned in the mold to enhance bonding of the injected pellets when they melt such that they from an integral boot form with excellent impact resistance properties. In another embodiment, a toe cap or heel cup having a different flexural modulus than the boot form itself may be separately injected and then placed in the mold to bond with the boot form during the subsequent injection process to provide increased impact protection.

Any of the above-described embodiments may be used alone or in combination with one another. Further, the hockey skate may include additional features not described herein. While several embodiments have been shown and described, various changes and substitutions may of course be made, without departing from the spirit and scope of the invention. The invention, therefore, should not be limited, except by the following claims and their equivalents.

What is claimed is:

1. A hockey skate, comprising:
a boot form including a lower portion and an upper portion molded to the lower portion, a flexibility of material of the upper portion being greater than a flexibility of material of the lower portion such that the upper portion is less rigid than the lower portion, the material of the lower portion being a composite and the material of the upper portion being a composite; and
a skate quarter attached to the upper portion of the boot form.

2. The hockey skate of claim 1 further comprising a flexible tab molded to a rear region of the boot form, and a tendon guard attached to the flexible tab.

3. The hockey skate of claim 1 wherein the material of the lower portion of the boot form is reinforced with fibers selected from the group consisting of carbon, glass, and aramid fibers.

4. The hockey skate of claim 1 further comprising a flexible tab molded to a rear region of the boot form.

5. The hockey skate of claim 1 further comprising a blade holder attached to a bottom region of the lower portion of the boot form.

6. The hockey skate of claim 1, wherein the material of the lower portion has a first flexural modulus and the material of the upper portion has a second flexural modulus, the second flexural modulus being different from the first flexural modulus.

7. The hockey skate of claim 6, wherein the second flexural modulus is less than the first flexural modulus.

8. The hockey skate of claim 7 wherein the first flexural modulus is approximately 4200 MPa, and the second flexural modulus is approximately 2100 MPa.

9. The hockey skate of claim 7 wherein the first flexural modulus is approximately 20,000 MPa, and the second flexural modulus is approximately 190 MPa.

10. The hockey skate of claim 1, wherein the lower portion of the boot form comprises an integral toe region.

11. The hockey skate of claim 10 further comprising a flexible tab molded to the integral toe region of the lower portion of the boot form, and a tongue attached to the flexible tab.

12. The hockey skate of claim 1, wherein a composition of the material of the upper portion is different from a composition of the material of the lower portion.

13. A hockey skate, comprising:
a boot form including a lower portion and an upper portion molded to the lower portion, the lower portion comprising a first material and the upper portion comprising a second material, the first material having a flexural modulus greater than a flexural modulus of the second material, the first material being a composite and the second material being a composite; and
a skate quarter attached to the upper portion of the boot form.

14. The hockey skate of claim 13 further comprising a flexible tab molded to a rear region of the boot form, and a tendon guard attached to the flexible tab.

15. The hockey skate of claim 13 wherein the lower portion of the boot form includes an integral toe region.

16. The hockey skate of claim 15 further comprising a flexible tab molded to the toe region, and a tongue attached to the flexible tab.

17. The hockey skate of claim 13 wherein the first material is reinforced with fibers selected from the group consisting of carbon, glass, and aramid fibers.

18. The hockey skate of claim 13 further comprising a flexible tab molded to a rear region of the boot form.

19. The hockey skate of claim 13 further comprising a blade holder attached to a bottom region of the lower portion of the boot form.

\* \* \* \* \*